United States Patent [19]
Robinson

[11] 3,874,118
[45] Apr. 1, 1975

[54] ANIMAL ACTUATED DOOR
[76] Inventor: John C. Robinson, 2931 N. Hendricks, Hutchinson, Kans. 67501
[22] Filed: Dec. 14, 1973
[21] Appl. No.: 424,912

[52] U.S. Cl.......................... 49/402, 49/169, 119/29
[51] Int. Cl............................................... E05d 7/00
[58] Field of Search..................... 49/402, 168–170, 49/501, 478, 193; 119/19, 29, 54

[56] References Cited
UNITED STATES PATENTS

| | | | |
|---|---|---|---|
| 2,886,861 | 5/1959 | Bartlett................................. | 49/402 |
| 3,138,829 | 6/1964 | Grose.................................... | 49/193 |
| 3,314,196 | 4/1967 | Betz et al............................. | 49/478 |
| 3,391,674 | 7/1968 | Burleigh............................... | 119/29 |

Primary Examiner—Kenneth Downey
Attorney, Agent, or Firm—Berman, Bishoff & Platt

[57] ABSTRACT

An animal-operated door consisting of a rigid closure plate hinged at one vertical side edge to a vertical margin of a doorway and employing a spring biasing the closure plate towards a closed position. The opposite vertical side edge of the closure plate has a 45° integral flange extending for its full height, allowing a dog or similar animal to open the door by pushing its snout between the flange and the adjacent side margin of the doorway. The flange has perforations distributed thereover to prevent the closure plate from being opened by wind forces. The surface of the closure plate is smooth and otherwise offers no resistance to movement out of the doorway, thereby permitting the animal to back out of the doorway or to depart through the doorway from the inside without injury.

10 Claims, 4 Drawing Figures

ANIMAL ACTUATED DOOR

This invention relates to door structures, and more particularly to doors capable of being operated by domestic animals, such as cats or dogs.

A main object of the invention is to provide a novel and improved animal-operated door which is simple in construction, which is easy to install, and which is constructed so that an animal can be easily trained to operate the same.

A further object of the invention is to provide an improved animal-operated door which involves very inexpensive components, which is rugged in construction, and which allows an animal to either enter therethrough by a simple procedure or to leave therethrough without risk of injury to the animal.

A still further object of the invention is to provide an improved animal-operated door which is relatively neat in appearance, which is biased to a normally closed position to prevent the entry of insects, rodents, or the like through the associated doorway, and which is arranged so that it cannot be accidentally opened by normal wind forces.

A still further object of the invention is to provide an improved animal-operated door of simple construction provided with means whereby an animal can open the door by engaging its snout between a side portion of the door and the adjacent margin of the associated doorway and can enter or leave through the doorway without risk of injury.

Further objects and advantages of the invention will become apparent from the following description and claims, and from the accompanying drawings, wherein:

Figure 1:
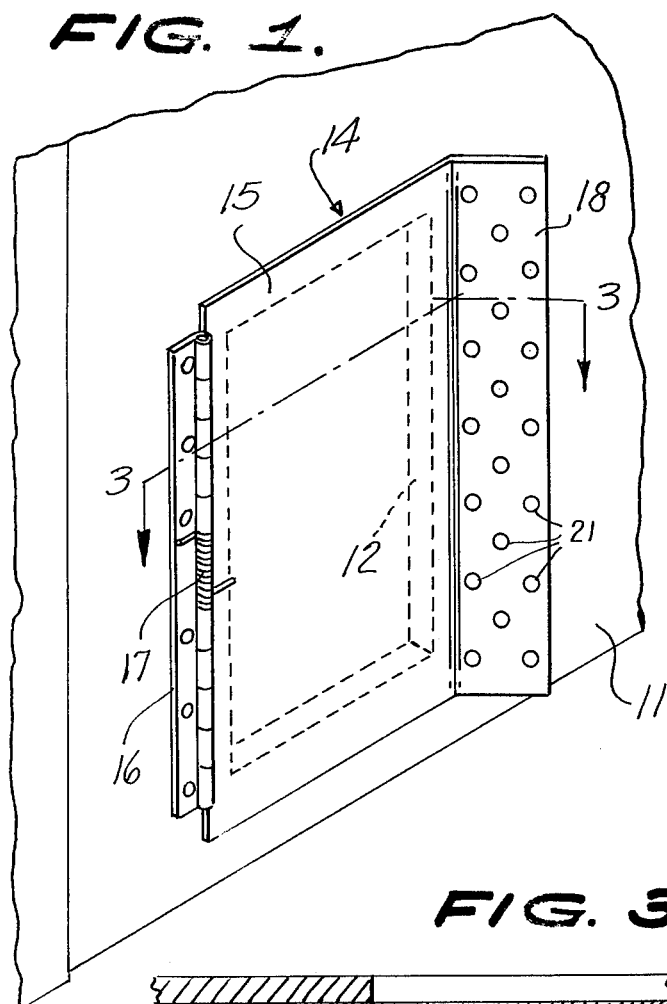
FIG. 1 is a perspective view, taken from the outside, of a portion of a building wall provided with a doorway having an improved animal-operated door constructed in accordance with the present invention.
Figure 2:
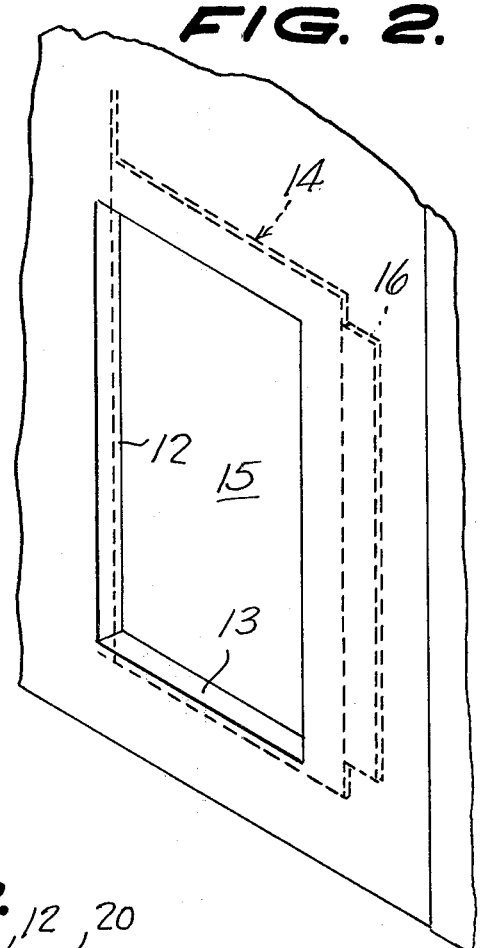
FIG. 2 is a perspective view of the doorway of FIG. 1, taken from the inside of the building.

Referring to the drawings, 11 designates the wall of a building provided with a rectangular doorway 12, which may be a doorway specifically intended for the passage of animals, such as cats or dogs, or alternatively, may be a normal doorway employed for entrance into or egress from the associated building. In the typical doorway 12 illustrated in the drawings, the bottom edge 13 of the doorway is shown as being elevated somewhat above ground level.

Designated generally at 14 is a door constructed in accordance with the present invention, which may comprise a single piece of sheet metal having a rectangular main body portion 15, defining a closure plate adapted to cover the doorway 12 and to overlap its margins, as shown in FIG. 1, the closure plate 15 being vertically hinged to wall 11 at one side margin of doorway 12, at the outside thereof, by means of a conventional vertical hinge assembly 16 provided with a biasing spring 17 acting on the closure plate element 15 to bias it towards closed position covering doorway 12.

The closure plate member 15 is integrally formed at its opposite vertical margin with inclined vertical flange 18 extending for the full height of the main body portion 15 of the door 14, the flange 18 being at an obtuse angle to main body 15, for example, at an angle of 135°, thereby defining an angle of 45° between flange 18 and wall 11 at the adjacent margin of doorway 12. The inside surface of closure plate 15 and the corner 20 defined between said closure plate and the flange 18 adjacent to the inside surface of the closure plate are preferably smooth so that they will not cause any injury to an animal rubbing thereagainst, for example, to an animal such as the one shown in dotted view in FIG. 4 which is in the process of passing through the doorway 12.

The flange 18 is formed with a plurality of ventilating perforations 21 distributed over its surface and being of sufficient size and quantity to allow air currents to pass therethrough and to prevent the door from being opened by normal wind forces.

As above-mentioned, the door 14, comprising the main closure plate body portion 15 and the flange 18, is preferably formed from a single generally rectangular piece of sheet metal of sufficient thickness to provide the required rigidity.

It will be apparent that the door 14 may be mounted on either the right or left side of a doorway by merely inverting it.

Figure 3:
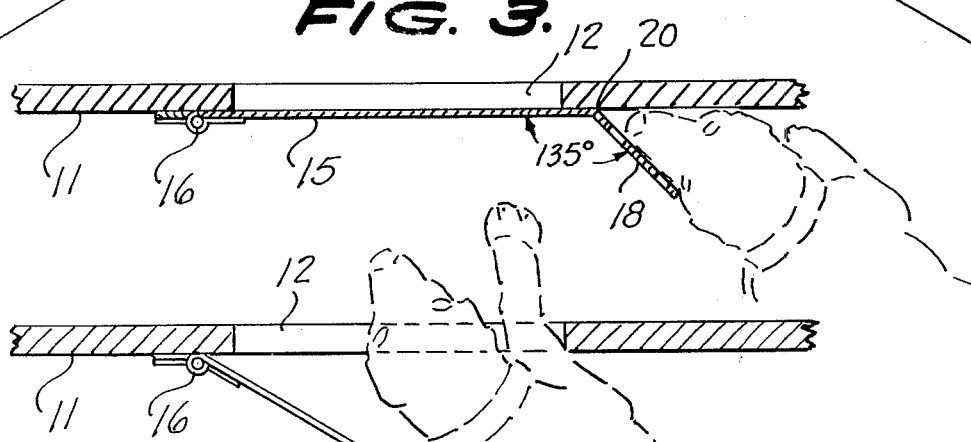
FIG. 3 is an enlarged horizontal cross-sectional view taken substantially on line 3—3 of FIG. 1, with the door shown in closed position and indicating the manner in which an animal inserts its snout between the vertical inclined flange of the door and the side marginal portion of the doorway preparatory to opening the door.
Figure 4:
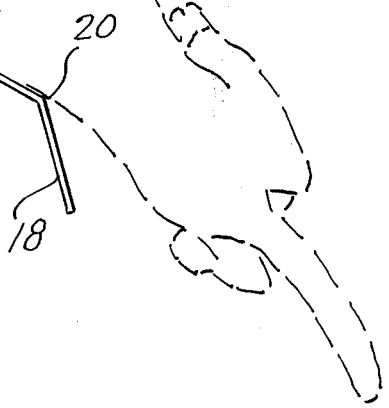
FIG. 4 is a horizontal cross-sectional view similar to FIG. 3, but showing the door in open position with the animal passing through the associated doorway.

As will be seen from FIGS. 3 and 4, the door 14 is constructed so that an animal can insert its snout in the convergent recess defined between the flange 18 and wall 11 and open the door 14 from the outside by a simple straight ahead pushing movement, without pivoting its head. Since the flange 18 extends for the full height of the door, an animal of almost any height can operate the door. The biasing spring 17, which can be either part of the hinge assembly 16, or which can be an independent spring attached between the door 14 and the margin of doorway 12 or a door frame attached to the doorway, is sufficiently yieldable to allow an animal of normal strength to push the door open by wedging its snout in the convergent recess defined between flange 18 and the adjacent wall surface in the manner above described. The spring, however, is of sufficient strength to promptly close the door after the animal has entered or departed.

An animal may pass outwardly through the doorway by pushing on the inside of the door itself, and the door will yield, allowing the animal to leave without causing injury to the animal because of the smooth inside surface of the door, as above-described. Similarly, if an animal wishes to back out after having partly entered the doorway, for example, if the animal is in a position such as that shown in dotted view in FIG. 4, the animal may retreat without injury to itself, since the corner portion 20 is relatively smooth and allows the animal to safely slide rearwardly past the same.

The door 14 may be an independent unit attachable to a building wall 18 in the manner illustrated in FIG. 1, or alternatively, may be part of an assembly including a door frame which is in turn attachable to a building around a suitable hole cut in the building wall. In the typical embodiment illustrated in the drawings, the door 14 is provided with the standard hinge assembly 16 which may be attached to the side margin of a doorway hole cut in the building wall 11.

As will be seen, the biasing spring 17, or the independent spring above-described, acts to keep the door securely closed when not in use. This not only eliminates drafts into the building but also prevents rodents and other small unwanted animals from making entrance into the building.

It has been determined that small animals, such as dogs particularly, can be trained in a very short period of time, to operate the door of the present invention, and that, as above-explained, a dog or other small animal can stop when partially through the door and back out without being injured. This overcomes a common difficulty encountered with presently provided doors which are hinged at the top, wherein if the animal starts to back out after it has partially entered or exited, the door clampingly engages the animal, the clamping engagement becoming tighter the harder the animal pulls, whereby the animal is sometimes quite seriously injured.

It will be further noted that since the door is made of sheet metal, it is not subject to destruction by dogs or other animals, since it cannot be readily damaged by chewing. In the case of swinging doors provided with plastic flaps, or other types of relatively vulnerable material, such flaps have been destroyed because of the tendency of the animals to play with and chew at the flaps. Furthermore, since the door 14 is constructed of metal, it is not readily subject to distortion and will not deteriorate seriously by exposure to weather or variations in climatic conditions. Many of the previously used plastic flap designs have proven to be unsatisfactory because of distortion and deterioration caused by such weather conditions.

Any type of suitable conventional hinge assembly may be employed, either a hinge assembly of a continuous type, or one employing spaced hinge elements. The hinge assembly is attached to the door in a manner such that the door may be installed by merely fastening the hinge assembly through screw holes provided therefor to the appropriate side marginal portion of the wall 11 adjacent the doorway.

While a specific embodiment of an improved animal-operated door assembly has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. In combination with a doorway, an animal-operated door comprising a rigid closure plate adapted to cover the doorway, hinge means connecting one side edge of the closure plate to a side margin of the doorway, spring means biasing the closure plate toward closed position over the doorway, and an inclined flange on the opposite side edge of the closure plate and merging smoothly therewith which permits non-injurious ingress or egress, said flange extending at an obtuse angle to said plate such that when the closure plate is in closed position over the doorway the flange defines, with respect to the adjacent side margin of the doorway, a tapering recess shaped to substantially conform with the shape of an animal's snout, whereby to enable an animal to engage its snout in the recess and thus force the closure plate open and to thereby allow the animal to pass through the doorway, said flange being of substantial height and extending along said adjacent side margin for a sufficient vertical length to allow a wide range of sizes of animals wishing to pass through the doorway to be able to insert their snouts in the recess.

2. The structural combination of claim 1, and wherein said flange is integral with the closure plate.

3. The structural combination of claim 2, and wherein said flange is at an angle of approximately 135° to the closure plate.

4. The structural combination of claim 3, and wherein the flange is provided with a plurality of ventilating perforations distributed thereover and of sufficient size and quantity to prevent the closure plate from being opened by wind forces.

5. The structural combination of claim 4, and wherein the closure plate and flange are formed from a single generally rectangular piece of sheet metal.

6. The structural combination of claim 1, and wherein said flange is substantially coextensive in height with said closure plate.

7. An animal-operated closure comprising a rigid closure plate adapted to cover a doorway, hinge means on one side of said plate adapted to be connected to the side margin of a doorway, spring means biasing said plate toward its position covering a doorway, and an inclined flange of substantial height with respect to the plate on the opposite side thereof merging smoothly therewith which permits non-injurious ingress or egress and extending at an obtuse angle substantially throughout its entire length with respect to said plate whereby a tapering recess shaped to substantially conform with the shape of an animal's snout is formed between the flange and the adjacent side margin of a doorway when installed to enable an animal to engage its snout in the recess and thus force the plate open.

8. The animal-operated door of claim 7, wherein said flange is substantially coextensive in height with said plate.

9. The animal-operated door of claim 8, wherein said plate and flange are integrally formed from a single generally rectangular piece of rigid sheet material.

10. The animal-operated door of claim 9, wherein said flange is perforated.

* * * * *